(12) United States Patent
Philipzik et al.

(10) Patent No.: US 9,126,688 B2
(45) Date of Patent: Sep. 8, 2015

(54) VEHICLE SEAT LOCKING DEVICE

(71) Applicant: RECARO Aircraft Seating GmbH & Co. KG, Schwaebisch Hall (DE)

(72) Inventors: Fabian Philipzik, Augsburg (DE); Marsel Mejuhas, Schwaebisch Hall (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 0 days.

(21) Appl. No.: 14/096,196

(22) Filed: Dec. 4, 2013

(65) Prior Publication Data

US 2014/0159441 A1    Jun. 12, 2014

(30) Foreign Application Priority Data

Dec. 6, 2012  (DE) .......................... 10 2012 111 887

(51) Int. Cl.
   *A47B 83/02*    (2006.01)
   *B64D 11/06*   (2006.01)
   *E05C 3/14*    (2006.01)

(52) U.S. Cl.
   CPC ............ *B64D 11/06* (2013.01); *B64D 11/0638* (2014.12); *E05C 3/14* (2013.01)

(58) Field of Classification Search
   CPC ....................................................... B64D 11/06
   USPC ................................................. 297/146, 163
   See application file for complete search history.

(56) References Cited

U.S. PATENT DOCUMENTS

| | | | | |
|---|---|---|---|---|
| 3,747,975 A | * | 7/1973 | McGregor ................... | 297/163 |
| 5,931,527 A | * | 8/1999 | D'Onofrio et al. .......... | 297/146 |
| 8,401,742 B2 | * | 3/2013 | Schliwa et al. ................ | 701/49 |
| 8,702,163 B2 | * | 4/2014 | Westerink et al. ............ | 297/163 |
| 2003/0094837 A1 | * | 5/2003 | Williamson et al. .......... | 297/163 |
| 2011/0156452 A1 | * | 6/2011 | Schumm et al. ............... | 297/163 |
| 2011/0187163 A1 | * | 8/2011 | Westerink et al. ............ | 297/163 |
| 2012/0012708 A1 | | 1/2012 | Hasegawa et al. | |
| 2013/0093220 A1 | * | 4/2013 | Pajic ............................ | 297/163 |

FOREIGN PATENT DOCUMENTS

| | | |
|---|---|---|
| DE | 60 2004 006 122 T2 | 12/2007 |
| DE | 10 2008 052 296 A1 | 4/2010 |
| DE | 10 2011 015 240 B3 | 7/2012 |
| EP | 1636087 A1 | 3/2006 |
| WO | 2011/094668 A2 | 8/2011 |

OTHER PUBLICATIONS

German Search Report dated Jul. 19, 2013 issued in the corresponding DE patent application No. 10 2012 111 887.6 (partial English translation attached).

* cited by examiner

*Primary Examiner* — Rodney B White
(74) *Attorney, Agent, or Firm* — Posz Law Group, PLC

(57) ABSTRACT

A vehicle seat locking device includes at least one object, in particular a table, and at least one locking unit which has at least one locking element and is provided for the purpose of locking the object in at least one stowed position. The locking unit has at least one pull actuating unit which is provided for the purpose of being actuatable as a result of a pulling movement on the locking element, the pulling movement having, in at least one movement portion, at least one movement component in the movement direction of the object.

23 Claims, 3 Drawing Sheets

VEHICLE SEAT LOCKING DEVICE

CROSS REFERENCE TO RELATED APPLICATION

Figure 1:
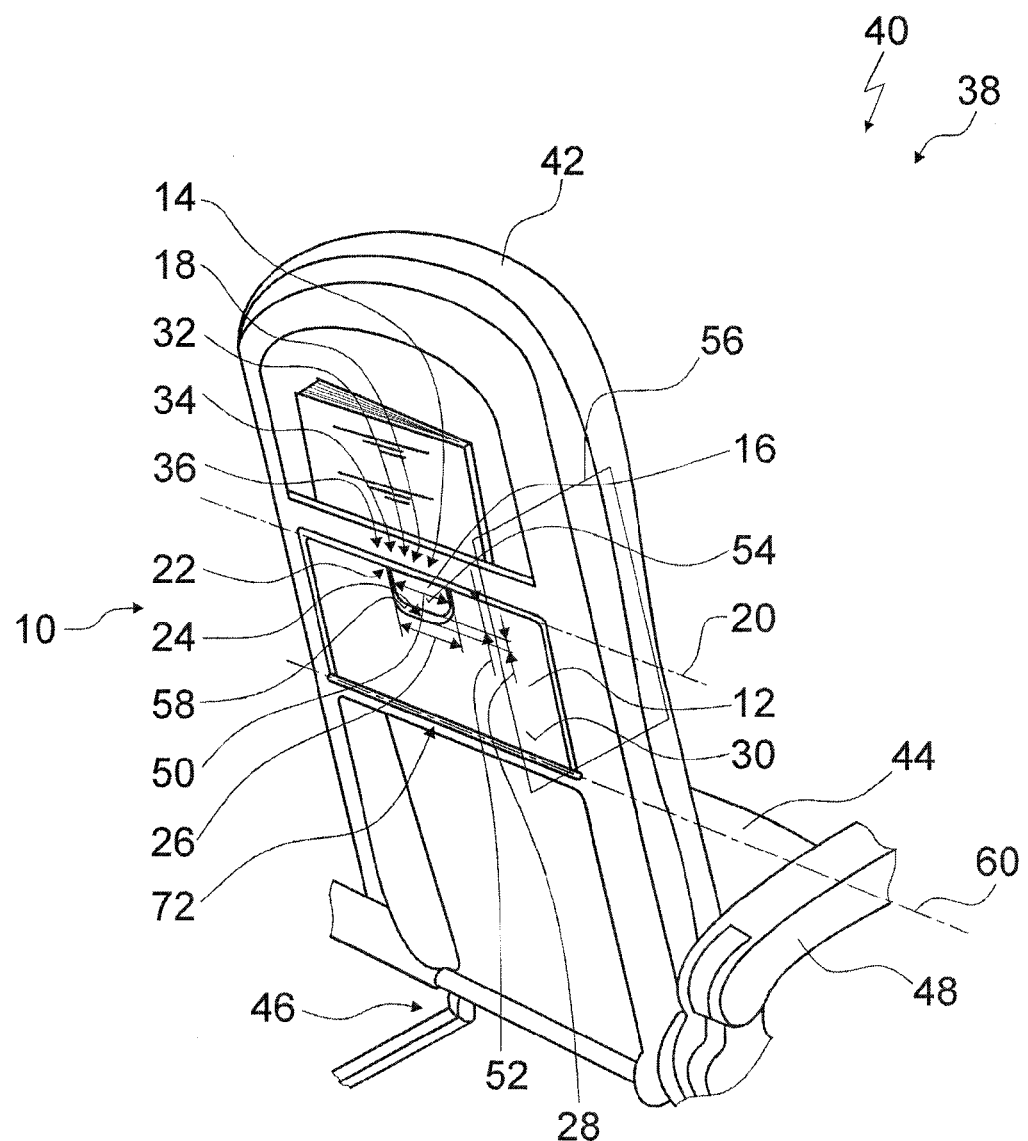

This application is based on and incorporates herein by reference German Patent Application No. 10 2012 111 887.6 filed on Dec. 6, 2012.

Prior Art

The invention relates to a vehicle seat locking device according to the preamble of claim 1.

A vehicle seat locking device, in particular an aircraft seat locking device, having at least one object, in particular a table, and having at least one locking unit which has at least one locking element and is provided for the purpose of locking the object in at least one stowed position has already been proposed. The locking element is realized as a hook or toggle. The locking element is mounted on a back-rest unit of a seat unit so as to be rotatable in a rotational plane which is aligned parallel to a plane spanned by an object surface of the object which is situated in the stowed position. The locking unit is actuatable by means of a rotational movement. In order to move the object out of the stowed position, a further second movement is necessary in addition to the unlocking movement, in particular the rotational movement in the rotational plane. The locking element is tensioned in the stowed position.

The objective of the invention is, in particular, to provide a generic mechanism with improved characteristics with regard to comfort for a passenger. The objective is achieved according to the invention by the features of claim 1, whilst advantageous developments and further developments of the invention can be found in the sub-claims.

Advantages of the Invention

The invention proceeds from a vehicle seat locking device, in particular an aircraft seat locking device, having at least one object, in particular a table, and having at least one locking unit which has at least one locking element and is provided for the purpose of locking the object in at least one stowed position.

It is proposed that the locking unit has at least one pull actuating unit which is provided for the purpose of being actuatable as a result of a pulling movement on the locking element, said pulling movement having, in at least one movement portion, at least one movement component in the movement direction of the object. The stowed position is preferably realized as a locked position. In particular, the object is realized as a table. In particular the object realized as a table has a single table top. In particular, it is conceivable that the object realized as a table is realized as a pull-out and/or foldable table. As an alternative to or in addition to a design of the object as a table, it is conceivable for the object to be realized as an in-seat screen. As an alternative to this or in addition to it, it is conceivable for the object to be realized as a lamp, in particular as a reading lamp. As an alternative to this or in addition to it, it is conceivable for the object to be realized as a back-rest unit, a seat bottom unit and/or an arm-rest unit. It is equally conceivable for the object to be realized as a component which appears sensible to an expert. In particular, the object is mounted so as to be pivotable on at least one aircraft seat component. The object is preferably mounted on the aircraft seat component so as to be pivotable about at least one object pivot axis. For example, the aircraft seat component is realized as a back-rest unit, a seat bottom unit, an arm-rest unit and/or a stand unit. The term "locking unit" is to be understood, in particular, as a unit which is provided for the purpose of locking the object in the stowed position. In particular, the locking unit is provided for the purpose of locking the object in the stowed position until actively assisted, in particular until actively assisted by a passenger. The locking unit is preferably provided for the purpose of locking the object in the stowed position up until the locking unit is actuated as a result of the active assistance. The locking unit is preferably provided for the purpose of locking the object in the stowed position independently of further external influences, in particular of vibrations and/or further external forces. In particular, the locking unit is mounted at least in part on the object. The term "further external influences" is to be understood, in particular, as influences which go beyond the active assistance, such as, for example, vibrations and/or further external forces, such as acceleration, braking and/or varying alignments of the object as well as of the locking unit in a space, in particular in an aircraft cabin. An "active assistance" is to be understood, in particular, as an action which is actively performed in particular by the passenger. In particular, the active assistance is realized as the pulling movement. The active assistance is preferably realized as a pulling movement which has, in at least one movement portion, at least one movement component in the movement direction of the object. The expression that the locking unit is "mounted at least in part on the object" is to be understood, in particular, as at least one element of the locking unit being mounted on the object. The term "provided" is to be understood, in particular, as especially designed and/or equipped. A "pull actuating unit" is to be understood, in particular, as a unit which is actuatable as a result of the pulling movement on the locking element. In particular, the pull actuating unit is realized as a pull unlocking unit. The locking unit, in particular the pull actuating unit, is preferably unlockable as a result of the pulling movement on the locking element. A "locking element" is to be understood, in particular, as an element of the locking unit. In particular, the locking element is provided for the purpose of being activated, in particular moved, as a result of the active assistance. The locking element is preferably coupled with the locking unit. In particular, the locking unit is actuatable as a result of an actuation of the locking element. The locking element is preferably mounted at least in part on the object. In an advantageous manner, the locking element is arranged at least to a great extent on the object. In an advantageous manner, the locking element is arranged at least to a great extent on the table top of the object realized as a table. In an advantageous manner, the locking element is arranged at least to a great extent on a side of the table top of the object realized as a table facing away from the back-rest unit in the stowed position. In an advantageous manner, the locking element is not arranged on an element which is fastened and/or arranged on the object. The expression that the locking element is arranged on the object "at least to a great extent" is to be understood, in particular, as up to a percentage by mass of more than 70%, in particular of more than 80% and in an advantageous manner of more than 90%, of the locking element being arranged on the object. For example, the locking element is realized as a toggle and/or as a hook and/or as a lever. It is equally conceivable for the locking element to be realized as a loop, in particular as a loop of a cable. In particular, the locking element is realized as a handle. The expression that the pulling movement has, in at least one movement portion, "at least one movement component in the movement direction of the object" is to be understood, in particular, when the movement direction is viewed in a vectorial manner, as the movement component of the pulling movement being at least substantially parallel to a movement vector of the movement direction. The movement direction is "viewed in a vectorial manner" is to be understood, in particular, as a viewing where a vector of the movement direction is divided into two vector parts, in particular movement vectors, which are aligned at least substantially vertically with respect to one another. In particular, adding the two vector parts together produces the vector of the movement direction. As a result of a development according to the invention, in an advantageous manner the object is able to be actuated, in particular unlocked, and moved with one single movement, in particular with one single hand movement of the passenger, in the direction of the pulling movement, which has the movement component in the movement direction of the object in the movement portion, in particular in the direction of the passenger, as a result of which it is possible to increase comfort for the passenger in an advantageous manner. In addition, the object, in particular in an emergency situation, is able to be actuated, in particular locked, with a hand movement, as a result of which passenger safety is able to be increased in an advantageous manner.

In addition, it is proposed that the locking unit has at least one pivot axis about which the locking element is pivotably mounted. In particular, the locking element is mounted so as to be pivotable in a plane aligned at least substantially vertically to an object surface of the object. The plane, in which the locking element is pivotably mounted, is preferably aligned at least substantially vertically to the object surface of the object and at least substantially vertically to the object pivot axis. In particular, the pivot axis is arranged at least substantially parallel to the plane spanned by the object surface of the object. The pivot axis is preferably arranged at least substantially in the plane spanned by the object surface of the object. For example, it is conceivable for the pivot axis to be directed in an inclined manner with respect to at least one object boundary line of the object. For example, the pivot axis encloses an angle within a range of between 0° non-inclusive and 90° non-inclusive with the object boundary line, in particular with the object pivot axis. In particular, the pivot axis is aligned at least substantially parallel to the object boundary line of the object. For example, the pivot axis is aligned at least substantially vertically to the object pivot axis. The pivot axis is preferably arranged in a lateral region of the locking element. The term "lateral region" of the locking element is to be understood, in particular, as a region which forms a boundary line of the locking element, in particular a lateral boundary line of the locking element. In particular, the lateral region is arranged inside a region boundary line which is aligned by the lateral boundary line and a boundary line which is at least substantially parallel to the lateral boundary line. In particular, a region height amounts to less than 30%, preferably less than 15% and in particular less than 5% of an amount of a locking element height. A "height" is to be understood, in particular, as an extension of the element aligned at least substantially vertically to the pivot axis. A "locking element height" is to be understood, in particular, as an extension of the locking element aligned at least substantially vertically to the pivot axis. A "region height" is to be understood, in particular, as an extension of the lateral region aligned at least substantially vertically to the pivot axis. The expression that the pivot axis is "arranged at least substantially in a plane spanned by the object surface of the object" is to be understood, in particular, as the pivot axis and the plane being aligned at least substantially parallel and being at a spacing of less than 1 cm, preferably of less than 0.5 cm and in particular of less than 0.1 cm. The expression that a straight line and/or plane is aligned "at least substantially vertically" to a further straight line and/or plane realized separately from the one straight line and/or plane is to be understood, in particular, as the straight line and/or plane enclosing an angle, which deviates from an angle of 90° by less than 5°, preferably by less than 3° and in particular by less than 1°, with the further straight line and/or plane. The expression that a straight line and/or plane is aligned "at least substantially parallel" to a further, straight line and/or plane realized separately from the one straight line and/or plane is to be understood, in particular, as the straight line and/or plane enclosing an angle, which deviates from an angle of 0° by less than 5°, preferably by less than 3° and in particular by less than 1°, with the further straight line and/or plane. As a result of a development according to the invention, the locking element is able to be advantageously mounted in a simple and pleasant manner.

In addition, it is proposed that the pivot axis is arranged in an upper region of the locking element. As an alternative to this, the pivot axis could be arranged in a lateral region of the locking element. An "upper region" of the locking element is to be understood, in particular, as a region which, in an upright position of a seat unit, in which a back-rest unit of the seat unit is aligned at least substantially vertically to a stand surface of the seat unit, and in an upright position of the locking element, in which a locking element surface of the locking element is aligned at least substantially vertically to the stand surface of the locking element, is realized as a region facing away from the stand surface. In particular, the pivot axis is aligned at least substantially parallel to the object pivot axis. As a result of a development according to the invention, a pleasantly simple mechanism can be provided in an advantageous manner, the handling of which is already familiar to a passenger as a result of known, comparable applications, such as, for example, in the case of a tailgate of a vehicle, in particular of an automobile.

Furthermore, it is proposed that the locking unit includes at least one recessed grip which has a recessed grip width of less than 20 cm. In particular, the recessed grip width is an amount less than 20 cm, in particular less than 15 cm and in an advantageous manner less than 12 cm. In particular, the recessed grip width is an amount in excess of 2 cm. In an advantageous manner, the recessed grip width is an amount which is greater than the width of a finger of a person, in particular of a passenger. The term "recessed grip" is to be understood, in particular, as a recess which is provided for the purpose of making it possible for an element, in particular the locking element, to be engaged behind. In particular, the recessed grip width is greater or equal to a locking element width of the locking element. The recessed grip preferably has at least a recessed grip height of less than 15 cm, in particular of less than 12 cm and in an advantageous manner of less than 9 cm. In particular, the recessed grip height is greater than or equal to the locking element height of the locking element. A "width" is to be understood, in particular, as an extension of the element aligned at least substantially parallel to the pivot axis. A "recessed grip width" is to be understood, in particular, as an extension of the recessed grip aligned at least substantially parallel to the pivot axis. A "locking element width" is to be understood, in particular, as an extension of the locking element aligned at least substantially parallel to the pivot axis. A "recessed grip height" is to be understood, in particular, as an extension of the recessed grip aligned at least substantially vertically to the pivot axis. As a result of a development according to the invention, a recessed grip can be achieved in an advantageous manner with a small recessed grip width, as a result of which an injury risk to a passenger produced as a result of an overly large recessed grip, for example by catching items of clothing in the excessively large recessed grip, can be reduced. In addition, more pleasant handling compared to an overly large recessed grip width can be achieved.

In addition, it is proposed that the recessed grip has a free recessed grip height of less than 5 cm. In particular, the recessed grip has a free recessed grip surface of less than 100 cm$^2$. A "free recessed grip height" is to be understood, in particular, as an in particular very small distance, aligned at least substantially vertically to the pivot axis, between a boundary line of the locking element facing away from the pivot axis and a boundary line of the recessed grip facing away from the pivot axis. A "free recessed grip surface" is to be understood, in particular, as a product of the free recessed grip height and the recessed grip width. As a result of the development according to the invention, a recessed grip can be advantageously achieved with a small free recessed grip height, as a result of which an injury risk to a passenger produced as a result of an overly large recessed grip, for example by catching items of clothing in the excessively large recessed grip, can be reduced. As a result, safety and comfort for the passenger can be increased.

In addition, it is proposed that the locking unit is provided for the purpose of outputting at least one locking signal when the object is locked. For example, it is conceivable for the locking signal to be realized as an optical locking signal. In particular, the locking signal is realized as an acoustic locking signal. The locking signal is preferably realized as a haptic locking signal. For example, the acoustic locking signal is realized as a sound. In particular, the acoustic locking signal is realized as a clicking noise. In particular, the haptic locking signal is realized as a latching-in and/or as a snapping-in of the locking element. As a result of a development according to the invention, a locking of the object can be indicated advantageously in a simple and pleasant manner.

In addition, it is proposed that at least in one locked position the locking element is arranged flush with an object surface of the object. In particular, the locking element is arranged flush with an object surface of the object in the locked position of the locking element. The locking element is preferably arranged in the plane spanned by the object surface in the locked position. In particular, the free recessed grip surface is arranged in the plane spanned by the object surface in the locked position of the locking element. The locking element is preferably mounted free of forces in the locked position. The expression that the locking element is "arranged in the plane spanned by the object surface" in the locked position is to be understood, in particular, as up to more than 80%, preferably up to more than 90% and in particular up to more than 95% of an amount of a locking element surface being arranged in the plane spanned by the object surface. As a result of a development according to the invention, it is possible in an advantageous manner to achieve a locking element which is arranged flush with the object surface of the object in the locked position and is consequently mounted securely. As a result, a function of the locking element can be permanently ensured, as a result of which a passenger can permanently actuate the locking unit in a comfortable manner as a result of the pull actuating unit. Furthermore, an optically appealing design can be realized in an advantageous manner.

In addition, it is proposed that the locking unit has at least one latching unit which is provided for the purpose of latching the object. A "latching unit" is to be understood, in particular, as a unit with at least one latching element which is deflected during a fastening operation in order to latch in behind a corresponding latching element subsequently as a result of a tension force. As a result of a development according to the invention, in an advantageous manner the object is able to be latched securely in the stowed position, as a result of which a risk of releasing the object out of the stowed position and consequently of a danger for a passenger is able to be reduced. As a result, reliability as well as comfort can be increased for the passenger. Furthermore, it is possible to achieve secure latching and fixing of the object in several directions, in particular in a direction aligned at least substantially parallel and in a direction aligned at least substantially vertically to the pivot axis.

In addition, it is proposed that the locking unit has a reset unit which is provided for the purpose of moving the locking element automatically back into a start position. In particular, the reset unit is realized as a spring element. The spring element is preferably realized as a tension spring. In particular, the spring element is realized as a helical spring. The spring element is preferably realized as a leaf spring. In particular, the start position of the locking element is realized as the locked position of the locking element. As a result of a development according to the invention, in an advantageous manner the locking element is able to be moved automatically back into the start position, as a result of which a passenger can conveniently be spared a job of moving the locking element back into the start position.

Furthermore, it is proposed that the locking unit has at least one triggering mechanism which is provided for the purpose of deflecting the locking element in the case of at least one movement of the object. In particular, the triggering mechanism is provided for the purpose of deflecting the locking element when the object is moved, in particular proceeding from a position of use, into the stowed position. The triggering mechanism preferably has at least one guide element which is provided for the purpose of deflecting a further guide element which is connected to the locking element when the object is moved. In particular, the triggering mechanism, in particular the guide element of the triggering mechanism, is provided for the purpose of pivoting the locking element, in particular the further guide element which is connected to the locking element, about the pivot axis. The further guide element is preferably connected fixedly to the locking element. In particular, the further guide element is rigidly connected to the locking element. As a result of a development according to the invention, in an advantageous manner the locking element is able to be deflected automatically when the object is moved, as a result of which a passenger is able to move the object easily, in particular avoiding obstacles. As a result, comfortable handling of the object can be achieved.

In addition, it is proposed that the locking unit is provided for the purpose of locking the object on a seat unit in the stowed position. In particular, the locking unit is provided for the purpose of locking the object in the stowed position on a back-rest unit of the seat unit. The pivot axis is preferably aligned at least substantially parallel to a seat bottom unit of the seat unit. In particular, the pivot axis is aligned at least substantially parallel to a back-rest unit of the seat unit. The object is preferably mounted on the back-rest unit of the seat unit so as to be pivotable. In particular, the object is mounted on the back-rest unit of the seat unit so as to be pivotable about the object pivot axis. As a result of a development according to the invention, in an advantageous manner the object is able to be locked on the seat unit, in particular on the back-rest unit of the seat unit, in a position the passenger is used to, as a result of which the passenger is able to be provided with a stowed position of the object which is known to the passenger and is consequently comfortable.

In addition, it is proposed that, in the movement portion, the movement component is directed so as to be inclined with respect to an object surface of the object. In particular, the movement component is realized as a main movement component. The amount of the movement component is preferably in excess of 70%, preferably in excess of 80% and in particular in excess of 90% of an amount of the pulling movement. The expression that, in the movement portion, the movement component is directed "so as to be inclined" with respect to the object surface of the object is to be understood, in particular, as the movement component, in the movement portion, enclosing an extremely small angle within the range of between 0° non-inclusive and 90° inclusive with the object surface of the object. In particular, in the movement portion, the movement component encloses an extremely small angle within the range of between 70° inclusive and 90° inclusive with the object surface of the object. An "extremely small angle" is to be understood, in particular, as an angle at an intersection of two straight lines and/or planes, the amount of which is smaller than or equal to an amount of a largest angle at the intersection of the two straight lines and/or planes. In particular, a sum of the smallest angle and of the largest angle amounts to at least substantially 180°. "At least substantially" in this context is to be understood, in particular, as a deviation from a predetermined value deviating in particular by less than 25%, preferably by less that 10% and in a particularly preferred manner by less than 5% of the predetermined value. As a result of a development according to the invention, in an advantageous manner the object is able to be moved comfortably, simply, securely and quickly by a seated passenger.

In addition, it is proposed that the vehicle seat locking device has at least one bearing unit which is provided for the purpose of supporting the object so as to be pivotable. In particular, the bearing unit has at least one object pivot axis about which the object is supported so as to be pivotable. In particular, the object pivot axis is realized as an immobile pivot axis. In an advantageous manner, the object pivot axis is arranged in an immobile manner on the seat unit, in particular on the back-rest unit. In an advantageous manner, the object is arranged fixedly on the seat unit, in particular on the back-rest unit, by means of the object pivot axis on one side of the object. In particular, the object is arranged on the seat unit so as to be pivotable about the immobile object pivot axis. In particular, when it is moved from the stowed position into the position of use, the object is arranged on the seat unit by means of the immobile object pivot axis. In particular, the object is provided for the purpose of not being lifted when moved from the stowed position into the position of use. As an alternative to this, it is conceivable for the bearing unit to have at least one support element, in particular at least two support elements, which is/are mounted on the seat unit so as to be pivotable about at least one pivot axis, the object being mounted on the support element so as to be pivotable about at least one further pivot axis. As a result of a development according to the invention, in an advantageous manner the object is able to be mounted in a way that is known and trusted by a passenger, as a result of which the passenger is able to move the object in a simple and pleasant manner.

In addition, it is proposed that the movement component of the pulling movement in the movement portion is aligned at least substantially in the direction of a pivoting direction of the object. In particular, the movement component of the pulling movement in the movement portion is aligned at least substantially in the direction of a tangent to the pivoting direction of the object. The movement portion of the pulling movement in the movement portion is preferably aligned at least substantially parallel to the pivoting direction, in particular to the tangent to the pivoting direction, of the object. In particular, the movement direction of the object is realized as the pivoting direction of the object. A "pivoting direction" is to be understood, in particular, as a direction in which at least one end region of the object pointing away from the object pivot axis is moved when the object is moved, in particular pivoted. In particular, the object, in particular the end region of the object, is moved at least substantially along a curved path, in particular a circular path, during the movement. As a result of a development according to the invention, in an advantageous manner the pulling movement on the locking element and the pivoting direction of the object are able to be connected together in a harmonious, pleasant manner.

Furthermore, an aircraft seat having at least one seat unit and having at least one vehicle seat locking device according to the invention is proposed. In particular, the seat unit, in an advantageous manner the aircraft seat, is realized as an economy class seat. As a result of a development according to the invention, in an advantageous manner an aircraft seat is able to be provided with a seat unit, as a result of which a passenger is able to make himself comfortable in the seat unit. In addition, the aircraft seat can be provided with the vehicle seat locking device according to the invention, as a result of which comfort for the passenger is able to be further increased.

DRAWINGS

Further advantages are produced from the following description of the drawing. An exemplary embodiment of the invention is shown in the drawings. The drawings, the description and the claims include numerous features in combination. The expert will also look at the features individually in an expedient manner and combine them to form sensible further combinations.

Figure 2:
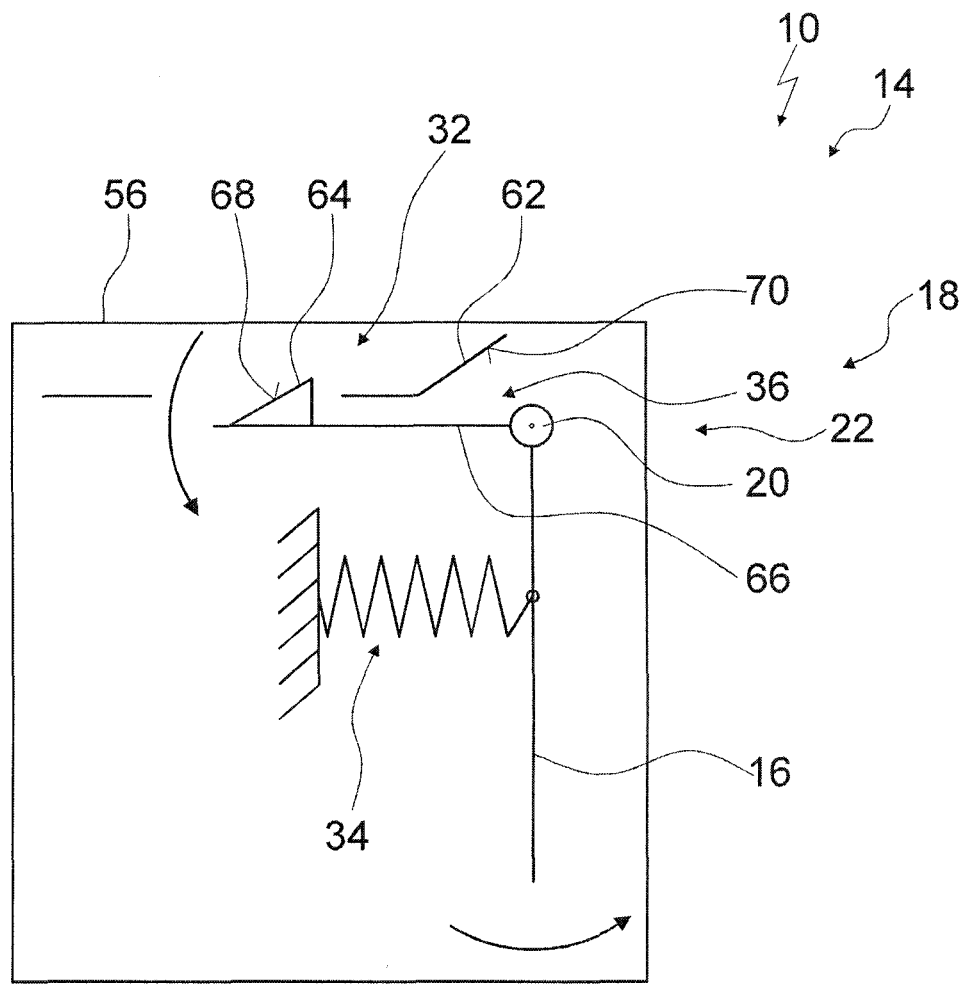
Figure 3:
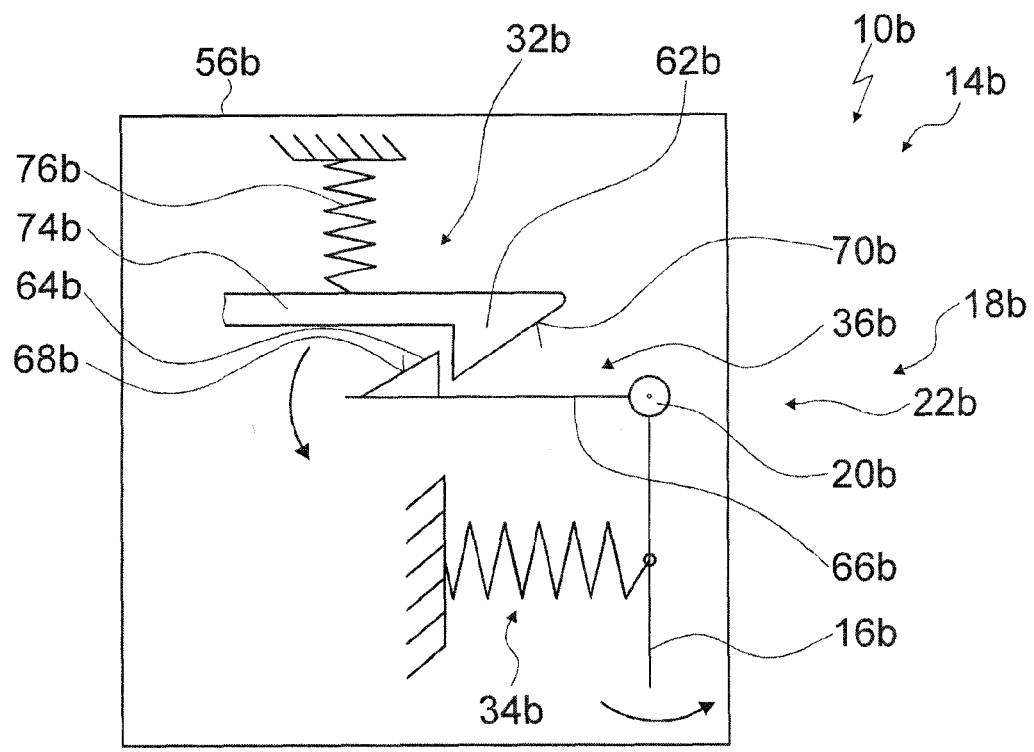
Figure 4:
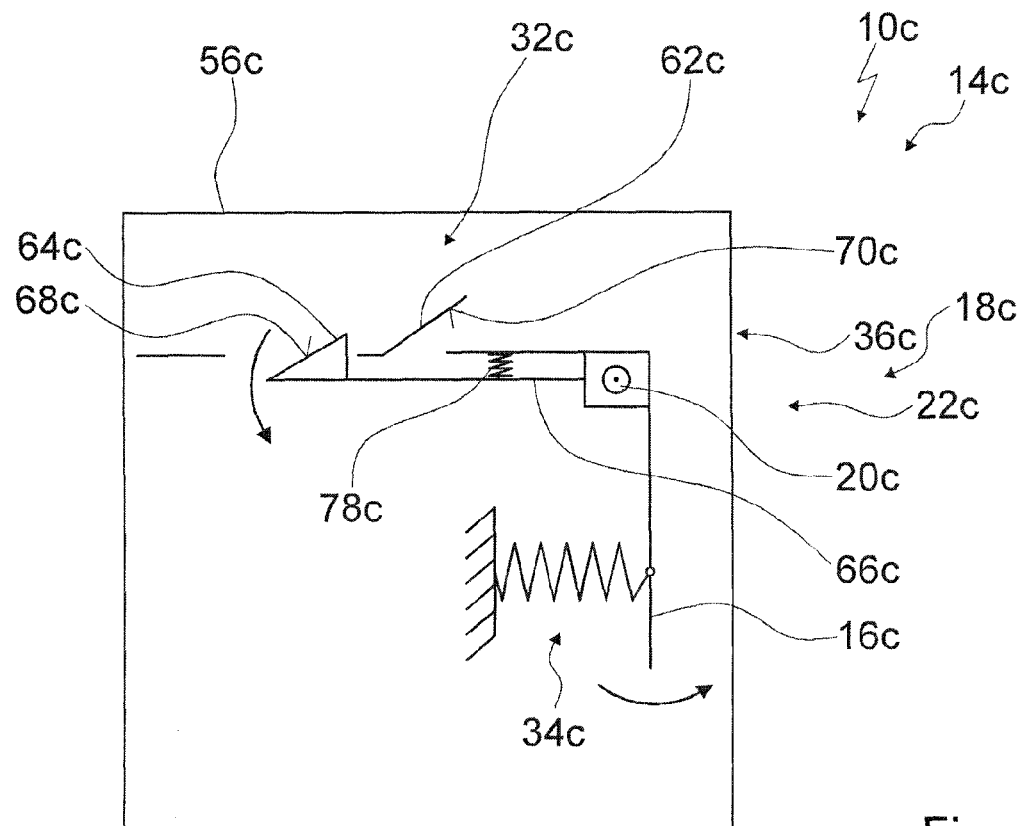

The drawings are as follows:

FIG. 1 shows a perspective representation of an aircraft seat according to the invention with a vehicle seat locking device according to the invention, FIG. 2 shows a schematic representation of a detail of the vehicle seat locking device according to the invention from FIG. 1, FIG. 3 shows a schematic representation of a detail of an alternative development of a vehicle seat locking device according to the invention and FIG. 4 shows a schematic representation of a detail of an alternative development of a vehicle seat locking device according to the invention.

DESCRIPTION OF THE EXEMPLARY EMBODIMENT

FIG. 1 shows a perspective representation of an aircraft seat 40 according to the invention having a seat unit 38 and having a vehicle seat locking device 10 according to the invention, the seat unit 38 being arranged in an upright position of the seat unit 38. The vehicle seat locking device 10 is realized as an aircraft seat locking device. The seat unit 38 has a back-rest unit 42 which is provided for a passenger (not shown) to lean his back against. In addition, the seat unit 38 has a seat bottom unit 44 which is realized as a seating area for the passenger. The back-rest unit 42 is mounted on the seat bottom unit 44 so as to be pivotable. The seat unit 38 has a stand unit 46 by means of which the seat unit 38 is stood on a support area. The support area is realized as a cabin floor. In addition, the seat unit 38 has an arm-rest unit 48 which is mounted on a seat divider of the stand unit 46 so as to be pivotable.

The vehicle seat locking device 10, actually the aircraft seat locking device, is provided with an object 12, actually a table, and with a locking unit 14 which has a locking element 16 and is provided for the purpose of locking the object 12 in a stowed position. FIG. 1 shows the object 12 in the stowed position. The locking element 16 is arranged in a locked position. In the stowed position of the object 12, the locking element 16 is always arranged in the locked position. In the present exemplary embodiment, the locking unit 14 is provided for the purpose of locking the object 12 on the seat unit 38 in the stowed position. As can be seen in FIG. 1, the locking unit 14 is provided for the purpose of locking the object 12 on the back-rest unit 42 of the seat unit 38 in the stowed position. The object 12 is mounted on the back-rest unit 42 so as to be pivotable.

The locking unit 14 has to be actuated in order to move the object 12 into a position of use (not shown) proceeding from the stowed position. The locking unit 14 actually has to be unlocked. The locking unit 14 has a pull actuating unit 18 which is provided for the purpose of being actuatable as a result of a pulling movement on the locking element 16, said pulling movement, in a movement portion, having a movement component in the movement direction of the object 12. In the present exemplary embodiment, the pull actuating unit 18 is realized as a pull unlocking unit. The locking unit 14 is unlockable as a result of the pulling movement on the locking element 16. For example, it is conceivable for the locking element 16 to be arranged on the back-rest unit 42 above the object 12 or to the side next to the object 12. In the present exemplary embodiment, the locking element 16 is arranged on the object 12. The locking element 16 is arranged flush with an object surface 30 of the object 12 in the locked position. As a result, an optically pleasing design is able to be realized and reliability increased.

The vehicle seat locking device 10 is provided with a bearing unit 72 which is provided for the purpose of supporting the object 12 so as to be pivotable. The bearing unit 72 is actually provided for the purpose of supporting the object 12 on the back-rest unit 42 so as to be pivotable. The bearing unit 72 has an object pivot axis 60 about which the object 12 is supported so as to be pivotable. The object 12 is supported at the back-rest unit 42 so as to be pivotable about the object pivot axis 60. The object pivot axis 60 is realized as a bottom pivot axis. The object pivot axis 60 is arranged in an end region of the object 12 facing the stand unit 46. When the object 12 is moved, the object 12 runs through a pivoting movement about the object pivot axis 60. The movement of the object 12 can be triggered by the pulling movement which is directed in an inclined manner with respect to the object surface 30 of the object 12. The movement component is, in the movement portion, actually inclined with respect to an object surface 30 of the object 12. In addition, the movement component of the pulling movement in the movement portion is aligned substantially in the direction of the pivoting direction of the object 12. The movement direction of the object 12 is actually realized as the pivoting direction of the object 12.

The locking unit 14 has a pivot axis 20, about which the locking element 16 is mounted so as to be pivotable. The locking element 16 is mounted so as to be pivotable in a pivot plane 56 which is aligned vertically with respect to the object surface 30 of the object 12 (cf. FIG. 2). The object 12 is mounted so as to be pivotable in the pivot plane 56 which is aligned vertically with respect to the object surface 30 of the object 12. The pivot axis 20 is arranged in a plane spanned by the object surface 30. Accordingly, the pivot axis 20 is aligned parallel to the object 12. Furthermore, the pivot axis 20 is aligned parallel to the back-rest unit 42 of the seat unit 38. In addition, the pivot axis 20 is aligned parallel to the seat bottom unit 44 of the seat unit 38. As can be seen in FIG. 1, the pivot axis 20 is arranged in an upper region 22 of the locking element 16. The upper region 22 is realized as a region facing away from the seat bottom unit 44 in the upright position of the seat unit 38. In addition, the upper region 22 is realized as a region facing away from the stand unit 46 in the upright position of the seat unit 38.

The locking element 16 has a locking element width 50 which is aligned parallel to the pivot axis 20. The amount of the locking element width 50 is 8 cm. In addition, the locking element 16 has a locking element height 52 which is aligned vertically to the pivot axis 20. The amount of the locking element height 52 is 5 cm. The locking element 16 has a locking element surface 54 which is realized substantially as a product from the locking element width 50 and the locking element height 52. The form of the locking element surface 54 is a rectangle with rounded corners. The locking element surface 54 is arranged in the plane spanned by the object surface 30 of the object 12. The amount of the locking element surface 54 is 40 cm$^2$. In an advantageous manner, compared to a locking element which is realized as a toggle or hook, it is possible as a result of a development of this type to achieve a more favorable load as a result of a larger support surface.

The locking unit 14 includes a recessed grip 24 which has a recessed grip width 26 of less than 20 cm. In the present exemplary embodiment, the amount of the recessed grip width 26 is 8.5 cm. Accordingly, the recessed grip width 26 is substantially equal to the locking element width 50 of the locking element 16. The recessed grip width 26 is aligned parallel to the pivot axis 20. The recessed grip 24 has a free recessed grip height 28 of less than 5 cm. In the present exemplary embodiment, the amount of the free recessed grip height 28 is 2 cm. The free recessed grip height 28 is aligned vertically to the pivot axis 20. Furthermore, the free recessed grip height 28 is aligned parallel to the locking element height 52 of the locking element 16. The recessed grip 24 has a free recessed grip surface 58 which is realized as a product from the free recessed grip height 28 and the recessed grip width 26. The amount of the free recessed grip surface 58 is less than 100 cm$^2$. In the present exemplary embodiment, the amount of the free recessed grip surface 58 is 17 cm$^2$. In an analogous manner to the free recessed grip height 28 and the recessed grip width 26, the free recessed grip surface 58 is arranged in the plane spanned by the object surface 30 of the object 12. The form of the free recessed grip surface 58 is a rectangle with rounded corners.

As already mentioned, the locking unit 14 has to be unlocked in order to move the object 12 into the position of use proceeding from the stowed position. The locking unit 14 is actuatable as a result of a pulling movement on the locking element 16. By maintaining the pulling movement on the locking element 16, the object 12 pivots about the object pivot axis 60 into the position of use. The locking element 16 is realized as a handle. As a result of a development of this type, the locking unit 14 is able to be unlocked and the object 12 moved into the position of use by means of one single hand movement, as a result of which comfort for the passenger is able to be increased.

As soon as the object 12 is arranged in the position of use, the passenger releases the locking element 16. This occurs normally in a deflecting position of the locking element 16. In the deflecting position, the locking element 16 is arranged for the most part outside the plane spanned by the object surface 30. Simply the upper region 22 around the pivot axis 20 is arranged in part inside the plane spanned by the object surface 30. Said position represents a potential source of danger to a passenger as there is an increased risk of the passenger catching his clothing and/or knocking parts of his body. The locking unit 14 has a reset unit which is provided for the purpose of moving the locking element 16 automatically back into a start position (cf. FIG. 2). In the present exemplary embodiment, the start position is realized as the locked position of the locking element 16. The reset unit 34 is realized as a spring element. For example, it is conceivable for the reset unit 34 to be realized as a leaf spring. It is equally conceivable for the reset unit 34 to be realized as a helical spring. In the present exemplary embodiment, the reset unit 34 is realized as a tension spring. When the locking unit 14 is actuated as a result of the pulling movement on the locking element 16, the reset unit 34 realized as a spring element is deflected. The locking element 16 is pivoted about the pivot axis 20 as a result of the pulling movement on the locking element 16. Once the locking element 16 is released, the reset unit 34 moves the locking element 16 back into the start position as a result of an internal pulling force. In this case, the reset unit 34 pivots the locking element 16 about the pivot axis 20 back into the start position. With the lack of external forces, the locking element 16 is always arranged in the plane spanned by the object surface 30.

FIG. 2 shows a schematic representation of a detail of the vehicle seat locking device 10 according to the invention. The locking unit 14 has a latching unit 32 which is provided for the purpose of latching the object 12. The latching unit 32 is actually provided for the purpose of latching the object 12 in the stowed position. The latching unit 32 has two latching elements 62, 64 which are provided for the purpose of latching the object 12 as a result of a coupling. The latching element 62 is arranged on the back-rest unit 42 of the seat unit 38. The locking unit 14 has a locking element lever 66 which is connected to the locking element 16 on the pivot axis 20. In the present exemplary embodiment, the locking element 16 and the locking element lever 66 are formed from one piece. On one end of the locking element lever 66 facing away from the pivot axis 20, the latching element 64 is mounted fixedly on the locking element lever 66. In the present exemplary embodiment, the locking element lever and the latching element 64 are formed from one piece. The latching element 62 is provided for the purpose of latching with the latching element 64 in the stowed position of the object 12. The latching element 64 actually engages behind the latching element 62 in the stowed position of the object 12.

Proceeding from the position of use, the object 12 is movable into the stowed position as a result of a pressing movement. When a pressing force is applied onto the object surface 30, the object 12 pivots about the object pivot axis 60. The locking unit 14 has a triggering mechanism 36 which is provided for the purpose of deflecting the locking element 16 when the object 12 moves. In the present exemplary embodiment, the triggering mechanism 36 is realized integrally with the latching unit 32. The triggering mechanism 36 is to be described below. In a cross sectional plane aligned parallel to the pivot plane 56, the latching element 64 is in the form of a right-angled triangle. In addition, the latching element 64 has a sliding face 68. In an analogous manner to this, the latching element 62 has a corresponding sliding face 70. The latching elements 62, 64 are provided for the purpose of deflecting the locking element 16 as a result of a sliding movement of the sliding faces 68, 70 when the object 12 is moved. The latching element 62 is realized as a guide element. The latching element 64 is realized as a further guide element. When the object 12 is moved into the stowed position proceeding from the position of use, the sliding face 68 of the latching element 64 abuts against the sliding face 70 of the latching element 62. As already mentioned, the latching element 64 is connected to the locking element 16 by means of the locking element lever 66 so as to be pivotable about the pivot axis 20. The locking element 16 is deflectable as a result of the pivotable connection between the latching element 64 and the locking element 16. If a predetermined tension force of the reset unit 34 is exceeded as a result of the pressing force of the pressing movement, the triggering mechanism 36 deflects the locking element 16. As a result, in an advantageous manner it is possible to achieve a harmonious movement of the object 12 into the stowed position. In addition, a job of manually deflecting the locking element 16 can be removed from the passenger in a convenient manner.

When the pressing force is applied further by the pressing movement, the latching unit 32 latches. The latching elements 62, 64 of the latching unit 32 actually latch. As a result, the object 12 locks in the stowed position. The locking unit 14 is provided for the purpose of outputting a locking signal when the object 12 locks. In the present exemplary embodiment, the locking signal is realized as a clicking noise. The locking signal is generated by the locking of the latching unit 32. Accordingly, the locking unit 14 is provided for the purpose of outputting an acoustic locking signal when the object 12 locks. In addition, the locking signal is realized as a haptic locking signal. If the passenger has his hand on the locking element 16 during the pressing movement, the latching-in of the latching unit 32 can be felt as a snapping-in of the locking element 16 into the locked position.

FIGS. 3 and 4 show two further exemplary embodiments of the invention. The following descriptions are limited substantially to the differences between the exemplary embodiments, it being possible to refer to the description of the other exemplary embodiments, in particular of FIGS. 1 and 2, with reference to unchanging components, features and functions. To differentiate between the exemplary embodiments, in each case the letter b is added to the references of the exemplary embodiment in FIGS. 1 and 2 and the letter c is added in the references of the exemplary embodiments of FIGS. 3 and 4. With reference to the components identified in the same manner, in particular with reference to components with the same references, it is possible in principle to refer to the drawings and/or the description of the other exemplary embodiments, in particular of FIGS. 1 and 2.

FIG. 3 shows a schematic representation of a detail of an alternative development of the vehicle seat locking device 10*b* according to the invention. The vehicle seat locking device 10*b* differs from the vehicle seat locking device 10 of the exemplary embodiment of FIGS. 1 and 2 by a development of a respective latching unit. A latching unit 32*b* has two latching elements 62*b*, 64*b* which are provided for the purpose of latching an object 12*b* as a result of a coupling. In addition, the latching unit 32*b* includes a latching lever 74*b* on which the latching element 62*b* is arranged. The latching lever 74*b* is arranged on a back-rest unit 42*b* of a seat unit 38*b*. The latching lever 74*b* is supported on the back-rest unit 42*b* by means of a latching lever spring element 76*b*. When the object 12*b* moves, the latching lever 74*b* is provided for the purpose of being deflected in opposition to a force generated by the latching lever spring element 76*b*. The latching lever spring element 76*b* is provided for the purpose of enabling the latching lever 74*b* to move back into a start position as a result of the force generated by the latching lever spring element 76*b*. The latching lever 74*b* has the latching element 62*b* on an end pointing away from the back-rest unit 42*b*. The latching element 62b has a wedge-shaped form with a sliding face 70b. A development of a locking element lever 66b is identical to a development of the locking element lever 66 of the exemplary embodiment of FIGS. 1 and 2. The latching element 62b is provided for the purpose of latching with a latching element 64b of the locking element lever 66b in a stowed position of an object 12b. In this connection, the latching element 64b engages behind the latching element 62b in the stowed position of the object 12b. The latching elements 62b, 64b are provided for the purpose of deflecting the locking element 16b as a result of a sliding movement of the sliding faces 68b, 70b when the object 12b moves.

FIG. 4 shows a schematic representation of a detail of an alternative development of a vehicle seat locking device 10c according to the invention. The exemplary embodiment of FIG. 4 differs from the exemplary embodiment of FIG. 2 in an arrangement of a locking element and a locking element lever relative to one another. A locking unit 14c has a locking element lever 66c which is connected to a locking element 16c on a pivot axis 20c. The locking element lever 66c is connected to the locking element 16c by means of a locking spring element 78c. FIG. 4 shows this in a schematic manner by way of an L-shaped locking element 16c. For example, the locking element 16c and the locking element lever 66c are connected together by means of a connecting bolt which forms the pivot axis 20c. In this connection, the locking spring element 78c is realized as a helical spring which is supported both on the locking element 16c and on the locking element lever 66c. Other arrangements of the locking element lever 66c, the locking spring element 78c and the locking element 16c which appear sensible to an expert are also conceivable as an alternative to this. A method of operation of the locking unit 14c is analogous to a method of operation of the locking unit 14a of the exemplary embodiment of FIG. 1.

LIST OF REFERENCES

10 Vehicle seat locking device
12 Object
14 Locking unit
16 Locking element
18 Pull actuating unit
20 Pivot axis
22 Upper region
24 Recessed grip
26 Recessed grip width
28 Free recessed grip height
30 Object surface
32 Latching unit
34 Reset unit
36 Triggering mechanism
38 Seat unit
40 Aircraft seat
42 Back-rest unit
44 Seat bottom unit
46 Stand unit
48 Arm-rest unit
50 Locking element width
52 Locking element height
54 Locking element surface
56 Pivot plane
58 Free recessed grip surface
60 Object pivot axis
62 Latching element
64 Latching element
66 Locking element lever
68 Sliding face
70 Sliding face
72 Bearing unit
74 Latching lever
76 Latching lever spring element
78 Locking spring element

The invention claimed is:

1. An aircraft seat locking device, comprising:
at least one object
a bearing unit having an object pivot axis supporting the object, the object pivoting about the object pivot axis of the bearing unit,
at least one locking unit including at least one locking element, wherein
the locking element is movably arranged on the object and locks the object in at least one stowed position, the locking element being movable to an actuating position for unlocking the object, and
the object is released from the stowed position and pivoted about the pivot axis to the position of use by moving and maintaining the locking element to the actuating position by applying a pulling force to the locking element.

2. The aircraft seat locking device according to claim 1, wherein the locking unit has at least one pivot axis about which the locking element is pivotably mounted.

3. The aircraft seat locking device according to claim 2, wherein the locking unit includes at least one recessed grip which has a recessed grip width of less than 20 cm.

4. The aircraft seat locking device according to claim 2, wherein the locking unit is provided for the purpose of outputting at least one locking signal when the object is locked.

5. The aircraft seat locking device according to claim 2, wherein the pivot axis is arranged in an upper region of the locking element.

6. The aircraft seat locking device according to claim 5, wherein the locking unit includes at least one recessed grip which has a recessed grip width of less than 20 cm.

7. The aircraft seat locking device according to claim 5, wherein the locking unit is provided for the purpose of outputting at least one locking signal when the object is locked.

8. The aircraft seat locking device according to claim 1, wherein the locking unit includes at least one recessed grip which has a recessed grip width of less than 20 cm.

9. The aircraft seat locking device according to claim 8, wherein the locking unit is provided for the purpose of outputting at least one locking signal when the object is locked.

10. The aircraft seat locking device according to claim 8, wherein the recessed grip has a free recessed grip height of less than 5 cm.

11. The aircraft seat locking device according to claim 1, wherein the locking unit is configured to output at least one locking signal when the object is in a locked position.

12. The aircraft seat locking device according to claim 1, wherein in at least one locked position the locking element is arranged flush with an object surface of the object.

13. The aircraft seat locking device according to claim 1, wherein the locking unit has at least one latching unit which is provided for the purpose of latching the object.

14. The aircraft seat locking device according to claim 1, wherein the locking unit has a reset unit which is provided for the purpose of moving the locking element automatically back into an original position.

15. The aircraft seat locking device according to claim 1, wherein the locking unit has at least one triggering mechanism which is provided for the purpose of deflecting the locking element in the case of at least one movement of the object.

16. The aircraft seat locking device according to claim 1, wherein the locking unit is provided for the purpose of locking the object on a seat unit in the stowed position.

17. The aircraft seat locking device according to claim 1, wherein in a direction of the pulling force is inclined with respect to an object surface of the object.

18. The aircraft seat locking device according to claim 1, wherein a direction of the pulling force is aligned at least substantially in a pivoting direction of the object 19. An aircraft seat having at least one seat unit and having at least one aircraft seat locking device according to claim 1.

20. The aircraft seat locking device according to claim 1, wherein the object is a table.

21. The aircraft seat locking device according to claim 1, wherein the locking unit has a pivot axis and the locking element is mounted to pivot about the pivot axis of the locking unit.

22. The aircraft seat locking device according to claim 1, wherein the locking element moves in a direction parallel to the object of the axis of the bearing unit.

23. The aircraft seat locking device according to claim 1, wherein the object is supported by a backrest unit so as to be pivotable about the object pivot axis.

\* \* \* \* \*